US005474787A

United States Patent [19]
Grey et al.

[11] Patent Number: 5,474,787
[45] Date of Patent: Dec. 12, 1995

[54] CHEWING GUM CONTAINING A LECITHIN/GLYCEROL TRIACETATE BLEND

[75] Inventors: Ronald T. Grey, Chicago; Mansukh M. Patel, Downers Grove; Edward Dubina, Chicago; Marc A. Meyers, Naperville, all of Ill.

[73] Assignee: The Wm. Wrigley Jr. Company, Chicago, Ill.

[21] Appl. No.: 327,209

[22] Filed: Oct. 21, 1994

[51] Int. Cl.$^6$ .................................................. A23G 3/30
[52] U.S. Cl. .................................................. 426/3; 426/5
[58] Field of Search .................................... 426/3–6

[56] References Cited

U.S. PATENT DOCUMENTS

| 2,193,873 | 3/1940 | Jordan | 426/662 |
| 4,742,485 | 6/1988 | Sharma et al. | 426/99 |
| 4,863,745 | 9/1989 | Zibell et al. | 426/5 |
| 4,904,482 | 2/1990 | Patel et al. | 426/3 |
| 4,931,295 | 6/1990 | Courtright | 426/5 |
| 5,041,293 | 8/1991 | Patel et al. | 426/3 |
| 5,135,761 | 8/1992 | Dave et al. | 426/5 |
| 5,139,789 | 8/1992 | Yatka et al. | 426/5 |
| 5,145,708 | 9/1992 | Patel et al. | 426/662 |
| 5,221,543 | 6/1993 | Zibell et al. | 426/3 |
| 5,227,182 | 7/1993 | Song et al. | 426/5 |
| 5,334,396 | 8/1994 | Yatka | 426/3 |

FOREIGN PATENT DOCUMENTS

| 0380066 | 8/1990 | European Pat. Off. . |
| WO89/00847 | 2/1989 | WIPO . |

OTHER PUBLICATIONS

Patel et al. Co-pending application U.S. Serial No.: 08/292,794, filed Aug. 18, 1994, entitled: "Improved Chewing Gum Containing Medium Chain Triglycerides." pp. 1–42.

Yatka et al. Co-pending PCT application No. PCT/US94/05771, filed May 27, 1994 entitled "Imporved Chewing Gum Containing Medium Chain Triglycerides." pp. 1–43.

Primary Examiner—Jeanette Hunter
Attorney, Agent, or Firm—Hill, Steadman & Simpson

[57] ABSTRACT

The present invention provides improved chewing gum formulations and bases including fine powder lecithin, as well as methods of producing chewing gum and bases that include fine powder lecithin. In an embodiment, the present invention provides a chewing gum formulation comprising an insoluble gum base, water soluble portion, a flavor, and at least 0.1% by weight of a blend of fine powder lecithin and glycerol triacetate.

20 Claims, No Drawings

CHEWING GUM CONTAINING A LECITHIN/GLYCEROL TRIACETATE BLEND

BACKGROUND OF THE INVENTION

The present invention relates generally to chewing gum. More specifically, the present invention relates to improved formulations for chewing gum and bases.

Chewing gum generally consists of a water insoluble gum base and a water soluble portion along with flavors. The water soluble portion with flavors dissipates during chewing and the gum base is retained in the mouth throughout the chew.

The insoluble gum base generally comprises elastomers, resins, fats and oils, softeners, and inorganic fillers. Elastomers can include synthetic isoprene copolymers, styrene-butadiene copolymers, polyvinylacetate, polyisoprene, polyethylene, vinylacetate-vinyl laurate copolymers, and combinations thereof. Natural elastomers that can be used include natural rubber.

The gum base can include elastomer plasticizers. Such elastomer plasticizers can include natural rosin esters, as well as other elastomer plasticizers. Additionally, the gum base can include fillers/texturizers and softeners/emulsifiers. Softeners are added to the chewing gum in order to optimize the chewability and mouth feel of the gum. Softeners/ emulsifiers that are typically used include tallow, hydrogenated tallow, hydrogenated and partially hydrogenated vegetable oils, cocoa butter, lecithin, and other components.

In addition to a water insoluble gum base portion, a typical chewing gum composition includes a water soluble portion of one or more flavoring agents. The water soluble portion can include bulk sweeteners, high intensity sweeteners, flavoring agents, softeners, emulsifiers, colors, acidulants, fillers, antioxidants, and other components that provide desirable attributes.

As noted above, it is known to use lecithin in chewing gum. The lecithin functions as the emulsifier/softener. In order to add lecithin to other chewing gum ingredients, lecithin is typically dispersed in soy bean oil or a vegetable oil containing soy bean oil. For example, it is known to use a lecithin blend that contains 63% lecithin and 37% soy bean oil.

Although lecithin can be dispersed in soy bean oil, unfortunately, soy bean oil has a very undesirable odor. Additionally, in chewing gum, soy bean oil can create off flavor notes.

However, if lecithin is not sufficiently dispersed, manufacturing problems can be encountered when lecithin and a liquid carrier is added to other chewing gum ingredients. For example, if one attempted to use a 95% particulate form of the lecithin without the appropriate liquid carrier, the lecithin will not disperse evenly when mixed into the gum. This will make it difficult, if at all possible, to manufacture a quality chewing gum. But, if lecithin is used alone, it will not disperse in the gum mixture very well and will start to clump.

The use and addition of lecithin in chewing gum has been described in a number of patents including U.S. Pat. Nos.: 5,041,293; 5,145,708; 4,904,482; 5,135,761; 2,193,873; 4,752,485; 4,604,288; as well as PCT 89/000847; EP 0 380 066; and U.S. patent application Ser. No. 08/292,794 filed Aug. 18, 1994.

SUMMARY OF THE INVENTION

The present invention provides improved chewing gum formulations and bases including fine powder lecithin, as well as methods of producing chewing gum and bases that include fine powder lecithin.

To this end, in an embodiment, the present invention provides a chewing gum formulation comprising an insoluble gum base, water soluble portion, a flavor, and at least 0.1% by weight of a blend of fine powder lecithin and glycerol triacetate.

In an embodiment, the formulation includes a bulk sweetener.

In an embodiment, the formulation includes a high intensity sweetener.

In an embodiment, the formulation includes an emulsifier.

In an embodiment, the formulation includes an elastomer plasticizer.

In an embodiment, the formulation includes an elastomer.

In a further embodiment, the present invention provides a gum base comprising an elastomer and at least 1.0% by weight of a blend of lecithin and glycerol triacetate.

In an embodiment, the base is wax free.

In an embodiment, the base is non-tacky.

In an embodiment, the base is bubble gum-type base.

In an embodiment, the base includes at least one resin.

In an embodiment, the ratio of lecithin to glycerol triacetate is approximately 1:2 to 2:1.

In still another embodiment, a method of creating chewing gum is provided comprising the steps of: mixing lecithin with glycerol triacetate to create a blend; and adding a blend to other chewing gum ingredients to create a chewing gum.

In an embodiment, the ratio of powder lecithin to glycerol triacetate is approximately 1:2 to 2:1.

An advantage of the present invention is to provide an improved chewing gum formulation including powder lecithin.

Further, an advantage of the present invention is that it allows purer forms of lecithin to be used to make chewing gum.

Another advantage of the present invention is that it provides an improved method for adding fine powder lecithin to other chewing gum ingredients.

Still further, an advantage of the present invention is that it provides a chewing gum composition including fine powder lecithin, but not having off flavor notes caused by vegetable oil carriers.

Additionally, an advantage of the present invention is that it provides a method for adding fine powder lecithin to other chewing gum ingredients that does not create manufacturing issues.

Moreover, an advantage of the present invention is that it provides an improved method for dispersing fine powder lecithin so that it can be used to create chewing gum.

Furthermore, an advantage of the present invention is that it provides a method for adding fine powder lecithin to a chewing gum formulation that provides for an even dispersion of the fine powder lecithin in the chewing gum.

Another advantage of the present invention is that it allows fine powder lecithin to be used in chewing gum and gum bases with an even dispersion of the lecithin.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved chewing gum formulations including lecithin and methods of making same. Pursuant to the present invention, glycerol triacetate is blended with fine powder lecithin to create a lecithin containing composition that can be added to other chewing gum ingredients to create chewing gum. As a carrier for fine powder lecithin, the glycerol triacetate provides a blend that affords the benefits of lecithin, but without an uneven dispersion of the lecithin and traditional off flavor notes which are caused by vegetable oil carriers.

Pursuant to the present invention, a purer form of lecithin, approximately 99%, can be used. In this regard, it has been found that pursuant to the present invention, fine powder lecithin can be used. Accordingly, preferably, the lecithin is a fine powder and not in granular form or particulate form. Blended with glycerol triacetate, the fine powder lecithin is easier to incorporate into chewing gum and gum base.

Pursuant to the present invention, the fine powder lecithin is added to glycerol triacetate, which is colorless, odorless, and tasteless. It has been found that glycerol triacetate is the blandest and most inert oil that the inventors' believe can be used in a blend with fine powder lecithin. It has also been found, however, with this mixture that there is a better softening of the chewing gum. Glycerol triacetate, also known as triacetin, has the chemical formula $C_3H_6(OOCCH_3)_3$ and a molecular weight of 218.2. Glycerol triacetate has a boiling point of 259° C. and a melting point of −78° C. Glycerol triacetate is soluble in water at 7.17 g/100 ml $H_2O$ and is infinitely soluble in both alcohol and ether.

Pursuant to the present invention, glycerol triacetate is used to disperse powder lecithin and the resultant product can be used in base or chewing gum formulations. In this regard, the lecithin/glycerol triacetate blend can be used as a softener, plasticizer, and/or emulsifying agent. The lecithin/glycerol triacetate can be used in a variety of different chewing gums and base formulations.

Chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

In an embodiment, in addition to the lecithin/glycerol triacetate blend, pursuant to the present invention, the chewing gum formulation may include other softeners/emulsifiers including tallow, hydrogenated tallow, hydrogenated and partially hydrogenated vegetable oils, cocoa butter, glycerol monostearate, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners, pursuant to the present invention, will comprise the fine powder lecithin/glycerol triacetate blend. However, other softeners can also be used including glycerin, aqueous sweetener solutions such as those containing sorbitol, hydrogenated starch hydrolysates, corn syrup and combinations thereof.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

Pursuant to the present invention, glycerol triacetate in liquid form is blended with fine powder lecithin. Preferably, the lecithin and glycerol triacetate are blended at a ratio of 1:2 to about 2:1. The resultant lecithin/glycerol triacetate blend can then be added to the other chewing gum ingredients at a variety of points during the manufacturing process.

The lecithin/glycerol triacetate product may be added at any time during processing of the base, but preferably, is added near the end of the batch to act as a softener. The lecithin/glycerol triacetate blend may be added to conventional bases that contain wax or to wax-free bases. Likewise, the lecithin/glycerol triacetate blend can be added to bases that may or may not contain polyvinyl acetate or terpene resins, or bases that contain natural gums or synthetic bases. Further, the lecithin/glycerol triacetate blend can be added to bases that are non-tacky, or are bubble gum bases.

Preferably, the lecithin/glycerol triacetate blend will be added so that it comprises approximately 1.0 to about 5.0% by weight of the base.

The lecithin/glycerol triacetate blend may also be added to a chewing gum formulation in its liquid form during processing of the chewing gum. The lecithin/glycerol triacetate blend may be added during the gum manufacturing at any time during processing, but preferably, early in the batch to allow thorough mixing with the gum base.

Preferably, the lecithin/glycerol triacetate blend will be added to the chewing gum formulation so that it comprises approximately 0.1% to about 1.0% by weight of the chewing gum formulation.

EXAMPLES

By way of example, and not limitation, examples of the present invention will now be given.

A mixture of fine powder lecithin and glycerol triacetate was made at a 1:2 ratio and 1:1 ratio. The fine powder lecithin and glycerol triacetate was incorporated in chewing gum. The examples are set forth below in Tables 1 and 2.

TABLE 1

|  | Ex. 1 | Ex. 2 | Ex. 3 |
| --- | --- | --- | --- |
| Sugar | 50.865 | 64.000% | 63.865% |
| Gum Base | 24.500 | 26.000 | 26.000 |
| Dextrose Monohydrate | 13.410 | — | — |
| Corn Syrup | 7.000 | 6.500 | 6.500 |
| Talc | 1.000 | — | — |
| Glycerin | 0.890 | 1.000 | 1.000 |
| Encapsulated Aspartame | 0.450 | 0.750 | 0.675 |
| Encapsulated Acesulfame K | 0.160 | — | 0.160 |
| Salt Solution | 0.100 | 0.100 | 0.100 |
| Spearmint Flavor | 1.375 | — | — |
| Lecithin | 0.250 | 0.250 | 0.250 |
| Peppermint Flavor | — | 1.400 | 1.450 |

TABLE 2

|  | Ex. 4 | Ex. 5 | Ex. 6 |
| --- | --- | --- | --- |
| Sugar | 51.015% | 64.025% | 63.765% |
| Gum Base | 24.500 | 26.000 | 26.000 |
| Dextrose Monohydrate | 13.410 | — | — |
| Corn Syrup | 7.000 | 6.500 | 6.500 |
| Talc | 1.000 | — | — |
| Glycerin | 0.890 | 1.000 | 1.000 |
| Encapsulated Aspartame | 0.450 | 0.750 | 0.675 |
| Encapsulated Acesulfame K | 0.160 | — | 0.160 |

TABLE 2-continued

|  | Ex. 4 | Ex. 5 | Ex. 6 |
| --- | --- | --- | --- |
| Salt Solution | 0.100 | 0.100 | 0.100 |
| Spearmint Flavor | 1.375 | — | — |
| Fine Powdered Lecithin | 0.050 | 0.075 | 0.175 |
| Glycerol Triacetate | 0.050 | 0.150 | 0.175 |
| Peppermint Flavor | — | 1.400 | 1.450 |

The gum formulas containing the mixture of fine powder lecithin and glycerol triacetate gave better softening properties to the chewing gum. The overall texture of the gum was shorter and the initial bite was also shorter. The blends did not contribute any off flavor notes to the chewing gum. It should be noted that these blends can also be incorporated into the gum base.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A chewing gum formulation comprising:

an insoluble gum base;

a water soluble portion;

a flavor; and at least 0.1% by weight of a blend of powdered lecithin and glycerol triacetate.

2. The chewing gum formulation of claim 1 wherein the ratio of lecithin to glycerol triacetate is approximately 1:2 to about 2:1.

3. The chewing gum formulation of claim 1 wherein the formulation includes a bulk sweetener.

4. The chewing gum formulation of claim 1 wherein the formulation includes a high intensity sweetener.

5. The chewing gum formulation of claim 1 wherein the formulation includes an emulsifier.

6. The chewing gum formulation of claim 1 wherein the formulation includes an elastomer plasticizer.

7. The chewing gum formulation of claim 1 wherein the formulation includes an elastomer.

8. The chewing gum formulation of claim 1 wherein the lecithin is fine powder lecithin.

9. A gum base comprising:

an elastomer; and at least 1.0% by weight of a blend of powder lecithin and glycerol triacetate.

10. The gum base of claim 9 wherein the base is wax free.

11. The gum base of claim 9 wherein the base is non-tacky.

12. The gum base of claim 9 wherein the base is bubble gum-type base.

13. The gum base of claim 9 including at least one resin.

14. The gum base of claim 9 wherein the ratio of lecithin to glycerol triacetate is approximately 1:2 to 2:1.

15. The gum base of claim 9 wherein the lecithin is fine powder lecithin.

16. A method of creating chewing gum comprising the steps of:

mixing fine powder lecithin with glycerol triacetate to create a blend; and adding the blend to other chewing gum ingredients to create a chewing gum.

17. The method of claim 16 wherein the ratio of lecithin to glycerol triacetate in the blend is approximately 1:2 to 2:1.

18. The method of claim 16 wherein the blend comprises approximately 0.1% to about 1.0% of the chewing gum.

19. A method for dispersing fine powder lecithin comprising the steps of blending fine powder lecithin with glycerol triacetate.

20. The method of claim 19 wherein the ratio of lecithin to glycerol triacetate in the blend is approximately 1:2 to 2:1.

* * * * *